(12) United States Patent
Bormann et al.

(10) Patent No.: US 11,060,933 B2
(45) Date of Patent: Jul. 13, 2021

(54) METHOD FOR DETERMINING LOADING OF A BEARING, A COMPUTER PROGRAM PRODUCT, A CONTROL FACILITY AND A DRIVE

(71) Applicant: Siemens Aktiengesellschaft, Munich (DE)

(72) Inventors: Ulf Bormann, Altdorf (DE); Hans-Henning Klos, Weigendorf (DE); Jürgen Schimmer, Nuremberg (DE); Jürgen Zettner, Veitsbronn (DE); Dirk Scheibner, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 196 days.

(21) Appl. No.: 16/395,578

(22) Filed: Apr. 26, 2019

(65) Prior Publication Data

US 2019/0331542 A1  Oct. 31, 2019

(30) Foreign Application Priority Data

Apr. 27, 2018 (EP) ..................................... 18169916

(51) Int. Cl.
  *G01L 5/00* (2006.01)
  *G01M 13/04* (2019.01)
(52) U.S. Cl.
  CPC ........... *G01L 5/0009* (2013.01); *G01M 13/04* (2013.01)
(58) Field of Classification Search
  CPC .............................. G01L 5/0009; G01M 13/04
  USPC ..................................................... 73/862.04
  See application file for complete search history.

(56) References Cited

U.S. PATENT DOCUMENTS

| 4,406,169 | A | * | 9/1983 | Ikeuchi | ................. | G01M 13/04 73/862.541 |
| 5,587,635 | A | | 12/1996 | Shimizu et al. | | |
| 6,349,252 | B1 | | 2/2002 | Imanishi et al. | | |
| 8,561,463 | B2 | | 10/2013 | Baehr et al. | | |
| 2004/0193307 | A1 | | 9/2004 | Fujishima et al. | | |
| 2007/0074587 | A1 | * | 4/2007 | Mol | ...................... | F16C 19/522 73/862.322 |

(Continued)

FOREIGN PATENT DOCUMENTS

| CN | 105205222 A | 12/2015 |
| CN | 105787255 A | 7/2016 |

(Continued)

*Primary Examiner* — Max H Noori
(74) *Attorney, Agent, or Firm* — Henry M. Feiereisen LLC (57) ABSTRACT

In a method for determining loading of a bearing supporting a rotor of an electrical machine, the rotational speed and angular acceleration of the rotor is determined, matrix elements of a matrix are assigned to respective ranges of the angular acceleration and to respective ranges of the rotational speed, when the electrical machine is operated in a respective range of the angular acceleration and the rotational speed corresponding to the respective matrix element for a predefined time unit, an elementary variable, for example a value of 1, is added to the respective matrix element, and the loading of the bearing is determined as a weighted sum of the matrix elements. Thus, the matrix forms a representation of the operating time of the bearing and of the service life over time in relation to the rotational speeds and angular accelerations. The loading can be shown on a display.

17 Claims, 4 Drawing Sheets

(56) References Cited

U.S. PATENT DOCUMENTS

| | | | | |
|---|---|---|---|---|
| 2009/0272206 A1* | 11/2009 | Stumpf | ............... | G01D 18/00 |
| | | | | 73/866.5 |
| 2013/0211742 A1* | 8/2013 | Mol | ............... | G01L 1/06 |
| | | | | 702/43 |
| 2015/0247529 A1* | 9/2015 | Klos | ............... | G01B 21/16 |
| | | | | 374/46 |
| 2016/0103028 A1* | 4/2016 | Thomson | ............ | G01L 5/0019 |
| | | | | 702/42 |
| 2016/0123839 A1* | 5/2016 | Gallimore | ........... | F01D 21/003 |
| | | | | 384/448 |
| 2017/0126151 A1 | 5/2017 | Guguen | | |
| 2019/0331542 A1 | 10/2019 | Bormann et al. | | |

FOREIGN PATENT DOCUMENTS

| | | |
|---|---|---|
| CN | 107084842 A | 8/2017 |
| CN | 108426714 A | 8/2018 |
| CN | 110411749 A | 11/2019 |
| DE | 102004014452 A1 | 11/2004 |
| DE | 10 2008 060 762 A1 | 6/2010 |
| JP | S6034514 A | 2/1985 |
| JP | 2000141275 A | 5/2000 |
| KR | 20160134372 A | 11/2016 |
| RU | 2682215 C1 | 3/2019 |
| WO | WO 2017025231 A1 | 2/2017 |

* cited by examiner

METHOD FOR DETERMINING LOADING OF A BEARING, A COMPUTER PROGRAM PRODUCT, A CONTROL FACILITY AND A DRIVE

CROSS-REFERENCES TO RELATED APPLICATIONS

This application claims the priority of European Patent Application, Serial No. 18169916.6, filed Apr. 27, 2018, pursuant to 35 U.S.C. 119(a)-(d), the disclosure of which is incorporated herein by reference in its entirety as if fully set forth herein.

BACKGROUND OF THE INVENTION

The present invention relates to a method for determining loading of a bearing, to a computer program product, to a control facility and to a drive.

The following discussion of related art is provided to assist the reader in understanding the advantages of the invention, and is not to be construed as an admission that this related art is prior art to this invention.

Electrical machines generally have one or more bearings or slide bearings. Bearings and slide bearings are referred to as bearings here for the sake of simplicity. The bearings must be lubricated with lubricant at regular intervals over time. The bearing is used for mounting the rotor in a stator. Preferably, an electrical machine has at least two bearings. The bearings are loaded in a similar manner and with a similar load. Bearings are to be provided with a lubricant after a predefined running time. The time interval between lubrication procedures substantially depends on the loading of the bearing of the electrical machine.

One significant contribution to the loading of the bearing is an angular acceleration of the rotor of the electrical machine. A further contribution is the rotational speed, or angular velocity, at which the rotor of the electrical machine rotates. The terms "rotational speed" and "angular velocity" will be used synonymously in the following description. Bearings of electrical machines, which are regularly accelerated sharply or are operated at a particularly low or particularly high rotational speed, are particularly intensely loaded.

Disadvantageously, the loading of bearings in electrical machines is difficult to determine. This applies in particular to bearings in electrical machines which are operated at intensely varying rotational speeds. Due to the lack of knowledge of the loading of the respective bearing, an anticipated remaining operational life of the bearing and thus of the electrical machine can also be estimated only with difficulty. The consequences are more frequent maintenance work, in particular a more frequent relubrication of the respective bearing, than is usually necessary.

Attempts to solve the problem to date involved providing lubricant chambers, which are assigned to the respective bearings of the electrical machine. Disadvantageously, however, an excessive supply of lubricant leads to the thermal overloading of the bearing and thus to the failure of the electrical machine.

It would therefore be desirable and advantageous to enable improved ascertaining of the loading of a bearing of an electrical machine and to obviate other prior art shortcomings.

SUMMARY OF THE INVENTION

According to one aspect of the present invention, a method for determining loading of a bearing of an electrical machine, including determining a rotational speed and an angular acceleration of a rotor of the electrical machine, wherein the rotor is supported in the bearing, assigning respective matrix elements of a matrix to respective ranges of the angular acceleration and to respective ranges of the rotational speed in one-to-one correspondence, when the electrical machine is operated in a respective range of the angular acceleration and a respective range of the rotational speed corresponding to the respective matrix element for a predefined time unit, adding an elementary variable to the respective matrix element, and otherwise leaving the respective matrix element unchanged, and determining the loading of the bearing as a weighted sum of the matrix elements of the matrix.

Advantageously, loading of the respective bearing may be displayed with the aid of a display. The bearing may, advantageously, be designed as a roller bearing or as a slide bearing.

Advantageously, the loading may be compared with a permissible loading of the respective bearing and it may be calculated when the permissible loading has been reached.

Advantageously, it can then be estimated based on the difference between the loading and the permissible loading, when maintenance of the respective bearing will be necessary. Maintenance or replacement can thus be planned according to the loading.

Advantageously, the summation takes place after each addition of the elementary variable to the respective matrix element.

A bearing assigned to the electrical machine is a bearing which supports a shaft that is driven by the respective electrical machine. A bearing which is assigned to the electrical machine may also be the respective bearing of the electrical machine which serves to support the rotor of the electrical machine.

Advantageously, the rotational speed can be determined with the aid of an encoder on the electrical machine or by an analysis of the current or the voltage which is provided by a current source of the electrical machine. As an alternative or in addition, the rotational speed may take place by an analysis of the electrical field in the electrical machine or by an analysis of the vibration of the electrical machine.

Advantageously, the angular acceleration of the rotor can be determined by differentiating the angular velocity of the rotor with respect to time or by analyzing the voltage or the current provided to the electrical machine. As an alternative or in addition, the angular acceleration may also be measured directly at the electrical machine.

Advantageously, the maximum rotational speed is the maximum rotational speed of the electrical machine, and the maximum angular acceleration is the maximum angular acceleration of the electrical machine. Advantageously, the angular velocity is arranged in the columns of the matrix and the angular acceleration in the rows of the matrix.

Based on the loading of the bearing, the anticipated remaining operational life of the electrical machine, in particular of the bearing of the electrical machine, can be determined. The anticipated remaining operational life of the respective bearing corresponds to the difference between a maximum total operational life for a corresponding loading and the operating time of the respective bearing. Advantageously, the anticipated remaining operational life of the respective bearing is displayed on the electrical machine by a display. Advantageously, replacement or maintenance of the respective bearing can be timed accordingly.

The weighted sum of the matrix elements takes into consideration the different influence of different angular accelerations or different rotational speeds of the rotor of the electrical machine on the loading of the bearing. For the weighted sum, a first loading factor is taken into consideration, wherein the first loading factor represents a measure for the loading of the electrical machine at a rotational speed in a certain range. Furthermore, a second loading factor is taken into consideration, wherein the second loading factor represents a measure for the loading of the electrical machine at an angular acceleration in a certain range.

Advantageously, a display may be associated with the voltage source of the electrical machine, or with the electrical machine itself.

In one embodiment, the display may consist of an LED, which changes color when maintenance is due. Advantageously, the display may also assume the form of a traffic light.

With the present invention, the (present) loading of a bearing of an electrical machine can be determined and displayed without difficulties. Thus, it is particularly advantageous to identify at a glance whether or when maintenance, in particular a relubrication, is due to take place in the near future.

According to another advantageous feature of the present invention, the sum can be weighted by a first loading factor relating to the rotational speed or a range for the rotational speed, and by a second loading factor relating to the angular acceleration or a range for the angular acceleration.

Advantageously, the first and second loading factors may be interdependent. Advantageously, the first loading factor takes into consideration the loading as a function of the rotational speed at a respectively assigned angular acceleration. Furthermore, the second loading factor advantageously takes into consideration the loading as a function of the angular acceleration at a respectively assigned rotational speed. Alternatively, a loading factor may depend on both the rotational speed and the angular acceleration.

By linking the matrix elements with the loading factors, the loading of the electrical machine is advantageously able to be directly ascertained by the sum of the matrix elements.

When using loading factors that are independent of one another, it is possible to store the values for the angular acceleration and/or for the rotational speed in a list instead of a matrix. On the basis of the respective lists, the determination of the loading of the bearing may take place in a simplified manner. To this end, the respective rotational speed value is multiplied by the first loading factor. Furthermore, the respective angular acceleration value is multiplied by the second loading factor. The sum of the products corresponds to the loading of the bearing.

By taking into consideration the influences of angular acceleration and/or rotational speed on the bearing separately, a particularly simple determination of the loading of the bearing of the electrical machine takes place.

Due to the possibility of storing the rotational speed values and/or the angular acceleration values in lists, it is advantageously possible to save on storage capacity and computing capacity, without further modification.

According to another advantageous feature of the present invention, in certain ranges, the first loading factor may be a linear function of the rotational speed and the second loading factor may be a quadratic function of the angular acceleration.

On the basis of an analysis relating to the influence of the rotational speed and the angular acceleration of the rotor on the operational life of the bearing, it has been possible to ascertain that the loading of the electrical machine rises linearly as the rotational speed increases. Furthermore, it has been possible to ascertain that the loading of the electrical machine rises as the square of the angular acceleration. Finally, the loading of the bearing increases sharply at low rotational speeds (1 . . . 20 rpm).

It has further been ascertained that the remaining operational life of the bearing of an electrical machine behaves inversely proportional to the rotational speed of the electrical machine.

By choosing said loading factors, it is possible for a determination of the loading of the respective bearing and thus the determination of an anticipated remaining operational life of the respective bearing to take place in a particularly simple manner.

According to another advantageous feature of the present invention, the method steps can be repeated after a time unit in each case.

Advantageously, a new entry into the matrix takes place after each time unit, for example after each second. The new entry is added to the respective matrix element, according to the rotational speed and the angular acceleration of the rotor during the time unit.

By way of the continual execution of the method steps, the loading can advantageously be determined during the entire running time of the electrical machine or of the bearing.

Care must be taken, however, depending on the choice of time unit, that the respective memory or the respective classification of the respective entry is sufficient for the anticipated value range of the entries of the matrix.

According to another advantageous feature of the present invention, the matrix can be normalized to one unit value in each case, in particular according to the time unit.

Advantageously, the sum of the matrix elements is normalized to 1. Such normalization advantageously takes place by the respective matrix entry being divided by the sum of the matrix elements. Normalization may also take place using the number of time units which have passed up to this point.

Computing time can be saved by normalizing every 10, 100 or 1000 time units.

The matrix can be advantageously stored in a memory. By way of a normalization, which is in particular continuous, a small memory can advantageously be chosen. In particular with long running times of the electrical machine, such a memory is advantageous.

According to another advantageous feature of the present invention, the rotational speed and the angular acceleration can be determined by way of a voltage supply, in particular a frequency converter.

The rotational speed advantageously takes place by determining the frequency of the current or the voltage which is provided to the electrical machine. The determination of the angular acceleration advantageously takes place by the time derivation of the change in frequency of the current, which is provided to the electrical machine.

By determining the rotational speed and/or the angular acceleration with the aid of the current supply of the electrical machine, it is advantageously possible to avoid the need for an encoder on the electrical machine.

According to another advantageous feature of the present invention, the matrix can include matrix elements in rows and columns, wherein the rotational speeds are arranged in each of the rows in rotational speed ranges and the angular accelerations are arranged in each of the columns in angular acceleration ranges.

This division of rotational speed ranges and angular acceleration ranges into rows and columns may also take place in the reverse manner. Optionally, it is possible for the respective matrix element to be linked to a temperature of the bearing, a moisture level of the surrounding area of the bearing, or an oscillation of the bearing.

The arrangement of the rotational speeds in rotational speeds ranges and of the angular accelerations in angular acceleration ranges advantageously takes place in a linearly rising manner with increasing indices or columns or rows of the matrix. Advantageously, the matrix is embodied with the same number of columns and rows. This makes it possible to process the matrix with ease.

Advantageously, the angular acceleration values and/or the rotational speed values can be arranged in equidistant acceleration and speed ranges.

Alternatively, the ranges with increasing angular acceleration and with particularly small angular velocity may be made smaller than the other ranges.

Alternatively, respective ranges may be designed with different sizes. Ranges for rotational speed and/or angular velocity in particular, for which the respective loading factor only shows a low deviation between the respective ranges, may be made larger. The ranges may be chosen as a function of the first derivation of the respective loading value according to the rotational speed or the angular acceleration.

In particular, a consolidation of ranges to form a single range serves to simplify the calculation of the loading.

By dividing the ranges for the respective values, the determination of the loading can be improved further.

According to another advantageous feature of the present invention, the rotational speeds and/or the rotational speed ranges can be normalized to a maximum rotational speed in each case and the angular accelerations and/or the angular acceleration ranges can be normalized to a maximum angular acceleration in each case.

The maximum rotational speed and/or the maximum angular acceleration are advantageously predefined by the specification of the electrical machine. Alternatively, the maximum rotational speed and/or the maximum angular acceleration may be normalized according to the respective intended purpose of the electrical machine.

By normalizing the respective entries, the loading of the respective electrical machine can advantageously be compared with the loading of a further electrical machine.

According to another advantageous feature of the present invention, an oscillation of the bearing of the electrical machine can be additionally ascertained, wherein the oscillation is included in the calculation of the loading of the bearing.

Loading of the bearing induced by the oscillation of the bearing is advantageously ascertained with the aid of a third loading factor.

The oscillation is advantageously ascertained by a measurement using an oscillation sensor, by way of example a structure-borne noise sensor, wherein the oscillation sensor is arranged in the region of the respective roller bearing. An oscillation which emerges from or acts on a roller bearing increases the loading of the bearing or indicates damage to the bearing.

Depending on the frequency of the oscillation, this may indicate a certain type and degree of damage to the respective bearing.

Advantageously, a third loading factor may be established by considering the oscillation of the bearing of the electrical machine. The third loading factor serves to connect the oscillation, in particular the oscillation frequency and/or the oscillation amplitude, with the loading of the respective bearing of the electrical machine.

In addition or as an alternative, further factors influencing the operational life of the bearing may be summarized into a list in each case. In one such list, for example, the dependency of the moisture level in the surrounding area of the bearing or an oscillation of the bearing may be represented as a function of the service life of the electrical machine. Based on the list, the loading of the bearing can be ascertained with the aid of a corresponding loading factor. The loading of the bearing can be ascertained as a function of rotational speed, torque, moisture level and/or oscillations by a sum of the respective loadings.

A four-dimensional matrix is also possible, in which every combination of rotational speed and angular acceleration is assigned a 2-tuple of oscillation amplitude and oscillation frequency.

Combined with the oscillation, which is preferably determined near the respective bearing, it is possible to determine the anticipated remaining operational life more precisely. In particular, pre-existing damage to the electrical machine and/or to the bearing can be taken into consideration when ascertaining the anticipated remaining operational life.

According to another advantageous feature of the present invention, the respective oscillation can be displayed, in particular as a function of the time. Advantageously, the frequency and/or the amplitude of the oscillation may be displayed. The display may display a course of the amplitude and/or the frequency of the oscillation as a function of time.

Advantageously, the representation of the frequencies (Fourier transformation) of the oscillations takes place by means of the display.

By representing the oscillation, in particular by comparing it with the anticipated remaining operational life, it is possible for the accuracy of the anticipated remaining operational life to be estimated in an improved manner on the basis of the loading of the electrical machine.

According to another advantageous feature of the present invention, an anticipated remaining operational life of the bearing, in particular the bearing of the electrical machine, can be displayed on the basis of the loading.

Based on the loading of the bearing of the electrical machine, it is also possible to estimate the anticipated remaining operational life by comparing with empirical values relating to operational lives of bearings with a similar scope of application. The dependency of the anticipated remaining operational life upon the loading, which has been ascertained by the method described here, is advantageously ascertained by a self-learning algorithm.

By way of the immediate display of the anticipated remaining operational life of the electrical machine and/or of the respective bearing, it is possible to plan maintenance in a particularly simple manner without risking failure of the electrical machine.

According to another aspect of the present invention, a computer program product is embodied to run on a computing unit, in particular on a computing unit of a control facility for an electrical machine, wherein the computer program product is embodied to perform the method described here when run on the computing unit.

The computer program product can have an interface for providing the rotational speed and optionally the angular acceleration. Furthermore, the computer program product advantageously has an input for the measured oscillations. Advantageously, the computer program product outputs the loading and/or the anticipated remaining operational life.

Advantageously, the computer program product is installed on the computing unit of the control facility.

Additionally, the computer program may be installed on a central server and executed by being retrieved from the control facility.

The computer program product is embodied to calculate a loading of a bearing on the basis of rotational speeds (and optionally angular accelerations) provided to it. The calculation takes place by means of the method described above.

When the computer program product is executed, it may be loaded into a memory (RAM) of the computing unit and executed by a processor (CPU). The calculated loading and/or the anticipated remaining operational life ascertained from the loading are advantageously displayed on a display, in particular a display unit.

Advantageously, the computer program product may output a message if there is an impending failure of the respective bearing.

Using a computer program product enables a particularly simple modification of an existing control facility for an electrical machine.

According to still another aspect of the present invention, a control facility has a computing unit and is assigned to a display, wherein the computing unit is embodied to perform the method described here, wherein the display is provided to represent the loading.

The control facility is advantageously embodied as a programmable logic controller (PLC) or as a movement controller, by way of example as SIMOTION D from the company Siemens AG. Alternatively, a current supply may also be equipped with a computing unit, wherein the computing unit is embodied to perform the method described here.

In a simple embodiment, the display may be embodied as a two-color LED, which changes color when a maximum permissible loading threatens to be exceeded or when the anticipated remaining operational life has expired. Advantageously, the representation of the loading or of the anticipated remaining operational life of the respective bearing takes place in a similar manner to a traffic light, wherein a yellow signal may indicate the necessity for relubrication.

In a display which is already present, in particular a display unit, the display of the loading and/or of the anticipated remaining operational life may be integrated on the display which is already present.

By using the control facility to perform the method, it is advantageously possible for the functionality of an existing control facility to be expanded.

According to yet another aspect of the present invention, a drive has an electrical machine, a current supply, in particular a frequency converter, as well as a control facility described above. The bearing is assigned to the electrical machine.

The drive can be part of an industrial plant or an electrically operated vehicle.

The electrical machine is supplied with current by the current supply when being driven. The current supply may advantageously be embodied as a (frequency) converter. Advantageously, the electrical machine may include an encoder, which is embodied to ascertain the rotational speed. As an alternative or in addition, the rotational speed may be provided by the control facility and/or by the current supply. The loading of the respective bearing or of the respective electrical machine is advantageously displayed on a display. The display is may advantageously be assigned to one of the drive components, preferably to the current source or the electrical machine with the respective bearing.

According to another advantageous feature of the present invention, loading and/or an anticipated remaining operational life can be displayed on a display, wherein the display is assigned to the electrical machine.

Advantageously, the display may be assigned to what is known as a Smart Box or to another add-on part of the electrical machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
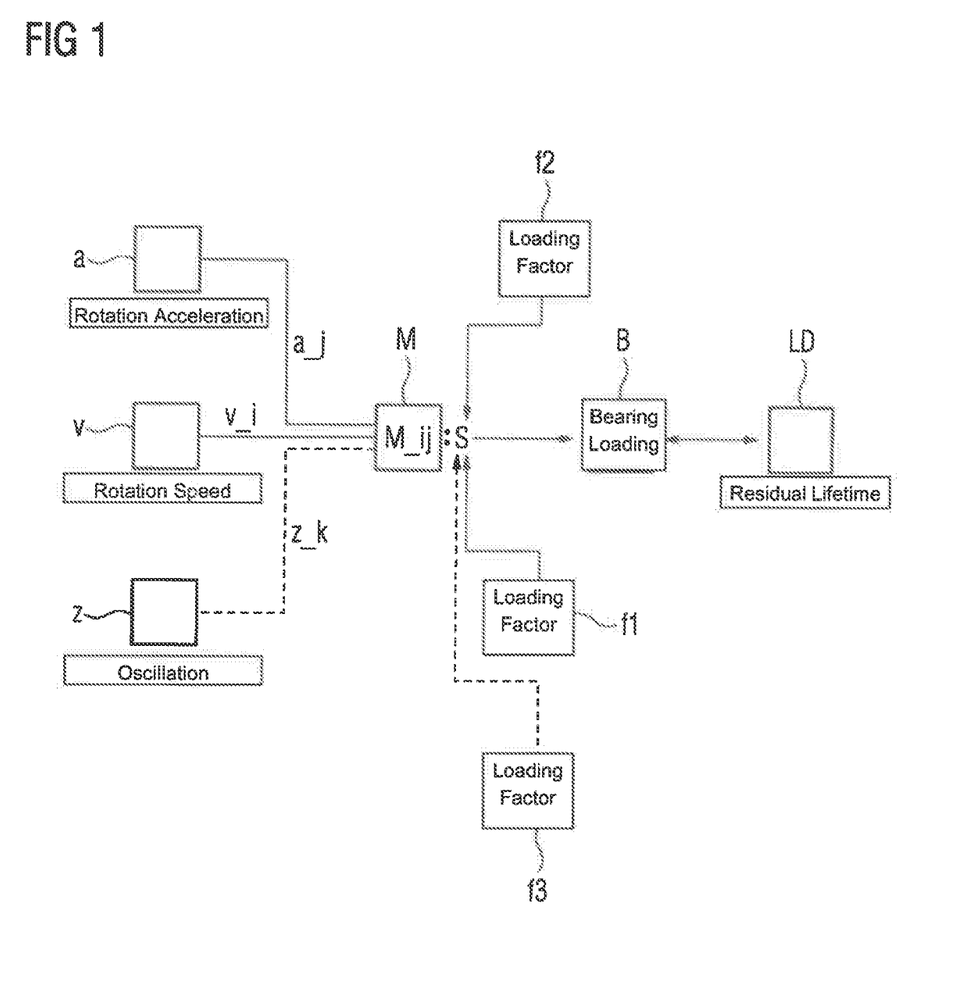
FIG. 1 shows a schematic representation of the method according to the present invention.

Turning now to the drawing, and in particular to FIG. 1, there is shown a schematic representation of the method. In the method, an angular acceleration a and an angular velocity v of a rotor of an electrical machine 1 are ascertained. Optionally, an oscillation z of an electrical machine 1 or of a bearing 3 of an electrical machine 1 may also be ascertained. The angular acceleration a and the angular velocity v and optionally an oscillation z are entered into matrix element $M\_ij$ of a matrix M, wherein the matrix elements in each case correspond to rotational speed ranges $v\_i$ and angular acceleration ranges $a\_j$, and oscillation ranges $z\_k$.

The rotational speed ranges and the angular acceleration ranges correspond, by way of example in the case of a 100×100 matrix, to one percent of the maximum rotational speed $v\_max$ and of the maximum angular acceleration $a\_max$ in each case.

Thus, for the range $v\_i$ of the rotational speed (i−1)% to i % of the maximum rotational speed is given as the lower boundary. Accordingly, for the range of the angular acceleration $a\_j$, (i−1)% to 1% of the maximum angular acceleration is given as the lower boundary. In this context, i=1, ..., 100. In other words, for the range $a\_i : a\_i = (a\_i-1, a\_i)$, and accordingly for $v\_j: v\_j = (v\_j-1, v\_j)$.

In each case, the respective entry $M\_ij$ is increased after a time unit t by an elementary variable x, preferably 1, provided that the rotor is moved at a rotational speed v in the respective range $v\_i$ and an angular acceleration a in the respective range $a\_j$.

$$M_{ij(t+1)} = M_{ij(t)} + \begin{pmatrix} x \text{ for } a \in a_j \text{ and } v \in v_i \\ 0 \text{ otherwise} \end{pmatrix} \quad (1)$$

Thus, at each time unit, a matrix element M_ij is increased by the elementary variable, preferably x=1, in each case.

The loading B of the electrical machine is in each case advantageously proportional to the matrix sum S. In this case, the time units t are natural numbers.

$$B(t) = \sum_{i,j} M_{ij}(t) \qquad (2)$$

Advantageously, weighting can be applied to equation (2) in the addition of the respective entry M_ij of the matrix M.

$$M_{ij}(t+1) = M_{ij(t)} + \begin{pmatrix} f1*f2: \; f1(v) \text{ for } v \in v_i \text{ and } f2(a) \text{ for } a \in a_j \\ 0: \text{ otherwise} \end{pmatrix} \qquad (3)$$

so that $$S(t) = M_{ij(t)} \text{ or } B(t) = \sum_{i,j} f1(v_i) \cdot M_{ij(t)} \cdot f2(a_j) \qquad (4)$$

for all times t.

As seen from eqs. (3) and (4), the weighted matrix sum S takes into consideration a first loading factor f1 and a second loading factor f2. The first loading factor f1 quantifies the loading of the bearing 3 according to the angular velocity v and the second loading factor f2 quantifies the loading of the bearing 3 according to the angular acceleration a. The weighted sum S relating to the loading factors f1, f2 corresponds to the loading B of the bearing 3 of the electrical machine 1. Optionally, a third loading factor f3 may also be taken into consideration, provided that the oscillation z has been taken into consideration in the matrix M as a third loading function f3. The loading B of the bearing 3 is inversely proportional to the anticipated remaining operational life LD of the respective bearing 3.

Figure 2:
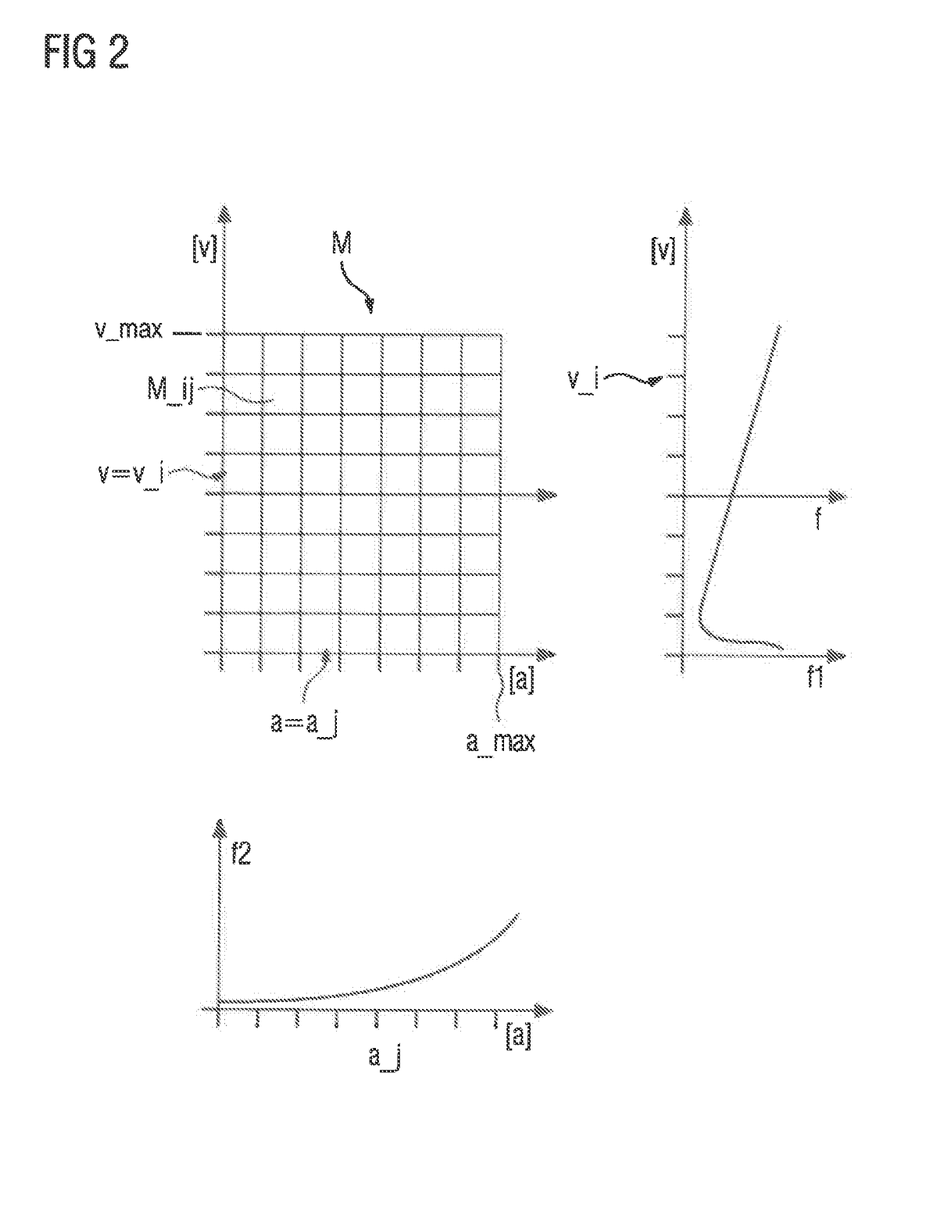
FIG. 2 shows a matrix and the entries thereof.

FIG. 2 shows a matrix M and the entries therein M_ij. The angular velocities v and the angular accelerations a are entered into matrix elements M_ij of the matrix M in each case. The matrix M is represented as a grid of the individual matrix elements M_ij, wherein the grid symbolizes that the combination of angular acceleration a and angular velocity v have been entered into the respective matrix element M_ij of the matrix M. Also shown is the dependency of the first loading factor f1 upon the angular velocity, wherein the first loading factor f1 shows a linear increase with the angular velocity v. Additionally, the course of the first loading factor 1 for low rotational speeds shows a strong increase of the first loading factor f1. Furthermore, the dependency of the second loading factor f2 upon the angular acceleration a is represented, wherein the second loading factor f2 shows a quadratic increase together with the angular acceleration a.

Figure 3:
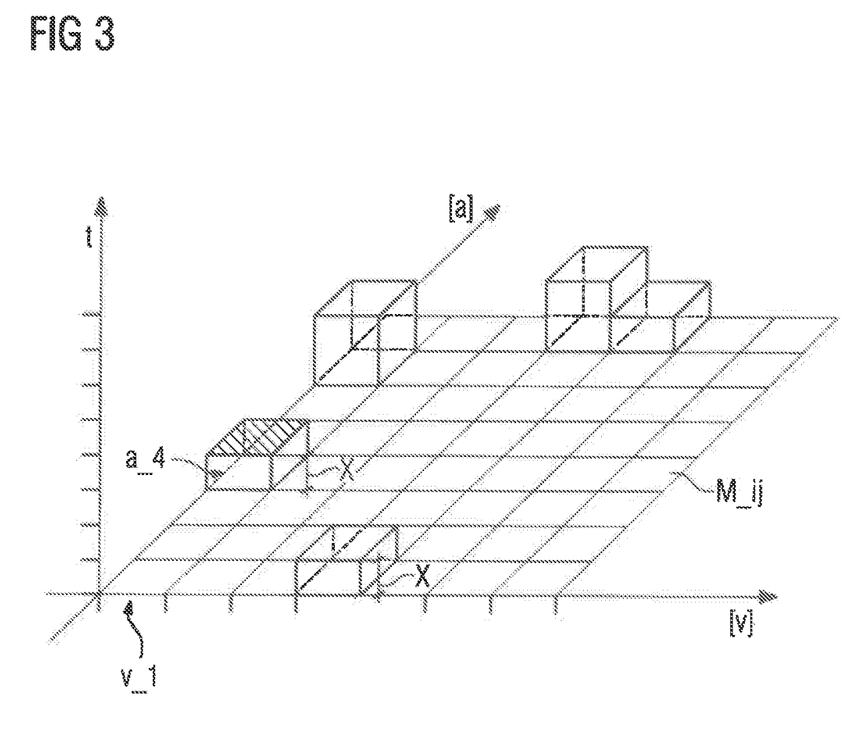
FIG. 3 shows a 3D representation of the matrix.

FIG. 3 shows a 3D representation of the matrix M, wherein in its base area the matrix M displays the entries M_ij symbolized as squares. The individual time units t are represented on the axis pointing upward. If an electrical machine 1 is operated at a certain angular velocity v and a certain angular acceleration a for a time unit t, then once the respective time unit t has expired, the matrix element M_ij of the matrix M is raised by the value of an elementary variable x. In this context, the raising of the respective matrix element M_ij is symbolized by boxes, which display the number of time units t during which the electrical machine has remained in a range v_i of the angular velocity v and in a range a_j of the angular acceleration a. The loading B corresponds to the weighted sum S over the matrix elements M_ij. The height of the box can advantageously be modified by a multiplication by the corresponding loading factors f1, f2, so that the weighting is included in the respective value of the respective matrix element M_ij. The shaded box is also singled out, wherein the shaded box corresponds to the matrix element M_14 (i=4; j=1). The box shows that the electrical machine 1 has been moved in a velocity range v_1 and in an angular acceleration range a_4 for a time unit t.

Figure 4:
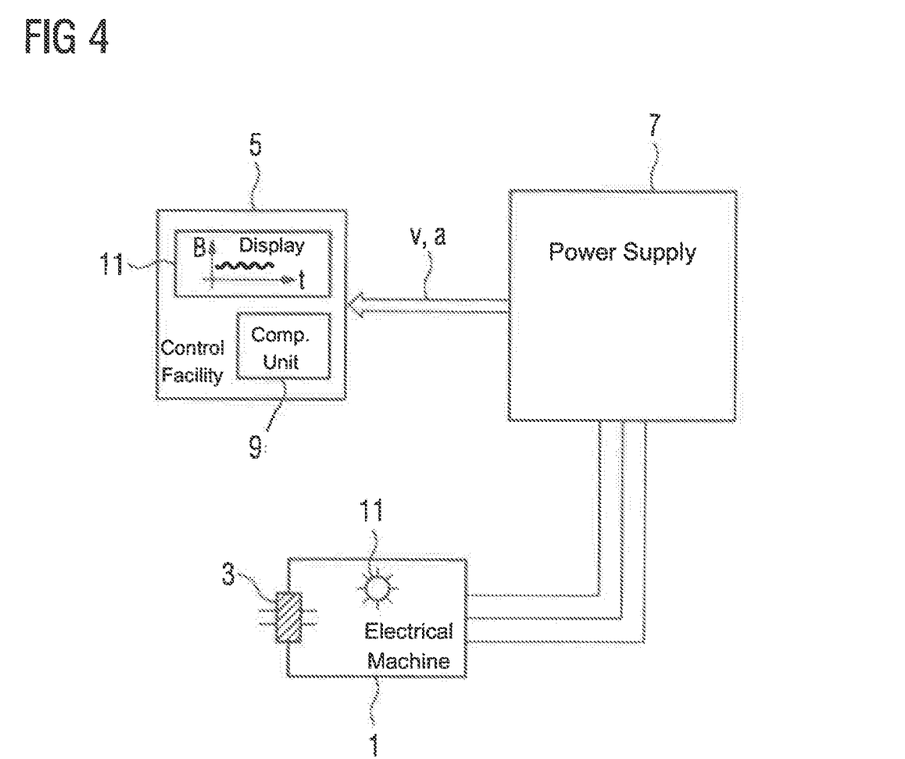
FIG. 4 shows a drive according to the present invention.

FIG. 4 shows a drive. The drive comprises an electrical machine 1, a current supply 7 and a control facility 5. The current supply 7 is advantageously embodied as a (frequency) converter. The current supply 7 provides a current for the electrical machine 1. The electrical machine 1 comprises at least one bearing 3, wherein the bearing 3 mounts the rotor of the electrical machine (not shown) in a rotatable manner.

The control facility 5 comprises a computing unit 9 and a display 11. The display 11 serves to display the loading B of the bearing. The loading is advantageously represented as a function of the time t. Moreover, the current supply 7 provides the angular velocity v and the angular acceleration a to the control facility 5. Such a provision may advantageously take place for each time unit t.

In summary, the invention relates to a method for determining a loading of a bearing 3, to a control facility 5, to a computer program product and to a drive. To determine the loading of the bearing 3, the rotational speed v and the angular acceleration a of a rotor of an electrical machine 1 are ascertained continuously, advantageously after each time unit t, wherein the rotor is assigned to the bearing 3. The ascertained rotational speeds v and angular accelerations a are divided into ranges v_i, a_j in each case and an elementary variable x is added to the matrix elements M_ij of a matrix M after the time unit t in each case. Thus, the matrix M forms a representation of the operating time of the bearing 3 and of the service lives over time in relation to rotational speeds v and angular accelerations a. The loading B of the bearing 3 is calculated by a weighted sum S of the matrix elements M_ij. The influence of rotational speed v and angular acceleration a on the loading B of the bearing 3 is obtained in each case by way of loading factors f1, f2, f3. Advantageously, the loading B is shown on a display 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining loading of a bearing of an electrical machine, the method comprising:
   a) determining a rotational speed and an angular acceleration of a rotor of the electrical machine, wherein the rotor is supported in the bearing;

b) assigning respective matrix elements of a matrix to respective ranges of the angular acceleration and to respective ranges of the rotational speed in one-to-one correspondence;

c) when the electrical machine is operated in a respective range of the angular acceleration and a respective range of the rotational speed corresponding to the respective matrix element for a predefined time unit, adding an elementary variable to the respective matrix element, and otherwise leaving the respective matrix element unchanged; and d) determining the loading of the bearing as a weighted sum of the matrix elements of the matrix.

2. The method of claim 1, wherein when the electrical machine is operated in the respective range of the angular acceleration and the respective range of the rotational speed corresponding to the respective matrix element for the predefined time unit, the weighted sum is weighted by a first loading factor relating to the respective rotational speed or to the respective range for the rotational speed, and by a second loading factor relating to the angular acceleration or to the respective range for the angular acceleration.

3. The method of claim 2, wherein over an identified respective range, the first loading factor is a linear function of the rotational speed, and wherein the second loading factor is a quadratic function of the angular acceleration.

4. The method of claim 1, wherein the steps a) through d) are repeated after each expiration of the predefined time unit.

5. The method of claim 4, wherein after each expiration of the predefined time unit, the matrix is normalized to a unit value.

6. The method of claim 1, wherein the rotational speed and the angular acceleration are determined by way of a voltage supply.

7. The method of claim 6, wherein the voltage supply comprises a frequency converter.

8. The method of claim 1, the matrix elements are arranged in rows and columns, with the rows corresponding to the respective ranges of the rotational speed and the columns corresponding to the respective ranges of the angular acceleration.

9. The method of claim 8, wherein the rotational speeds and/or the rotational speed ranges are normalized to a maximum rotational speed, and wherein the angular accelerations and/or the angular acceleration ranges are normalized to a maximum angular acceleration.

10. The method of claim 1, further comprising determining an oscillation of the bearing, and including the oscillation as a third loading factor when calculating the loading.

11. The method of claim 10, further comprising displaying the oscillation as a function of time.

12. The method of claim 1, further comprising displaying an anticipated remaining operational life based on the loading.

13. A computer program product embodied on a non-transitory storage medium, the computer program comprising program instructions which, when loaded into a memory of a computing unit of a control facility for an electrical machine and executed by the computing unit, causes the control facility to execute a method as set forth in claim 1.

14. A control facility determining loading of a bearing of an electrical machine, comprising:
a computing unit, and
a display configured to display the loading of the bearing,
wherein the computing unit is configured to
a) determine a rotational speed and an angular acceleration of a rotor of the electrical machine, wherein the rotor is supported in the bearing;
b) assign matrix elements of a matrix to respective ranges of the angular acceleration and to respective ranges of the rotational speed in one-to-one correspondence;
c) when the electrical machine is operated in a respective range of the angular acceleration and a respective range of the rotational speed corresponding to the respective matrix element for a predefined time unit, add an elementary variable to the respective matrix element, and otherwise leave the respective matrix element unchanged; and
d) determine the loading of the bearing as a weighted sum of the matrix elements of the matrix.

15. A drive, comprising:
an electrical machine,
a current supply, and
a control facility determining loading of a bearing of an electrical machine, the control facility comprising a computing unit, and a display configured to display the loading of the bearing,
wherein the computing unit is configured to
a) determine a rotational speed and an angular acceleration of a rotor of the electrical machine, wherein the rotor is supported in the bearing;
b) assign matrix elements of a matrix to respective ranges of the angular acceleration and to respective ranges of the rotational speed in one-to-one correspondence;
c) when the electrical machine is operated in a respective range of the angular acceleration and a respective range of the rotational speed corresponding to the respective matrix element for a predefined time unit, add an elementary variable to the respective matrix element, and otherwise leave the respective matrix element unchanged; and
d) determine the loading of the bearing as a weighted sum of the matrix elements of the matrix.

16. The drive of claim 15, wherein the current supply comprises a frequency converter.

17. The drive of claim 15, wherein the display is configured to additionally display an anticipated remaining operational life of the bearing.

* * * * *